H. RENOLD AND A. E. CARTER.
DRIVING CHAIN.
APPLICATION FILED AUG. 17, 1917.

1,306,078.

Patented June 10, 1919.
2 SHEETS—SHEET 1.

HANS RENOLD and
ADRIAN ETHELBERT CARTER, INVENTORS by
Attorney

H. RENOLD AND A. E. CARTER.
DRIVING CHAIN.
APPLICATION FILED AUG. 17, 1917.
1,306,078.
Patented June 10, 1919.
2 SHEETS—SHEET 2.
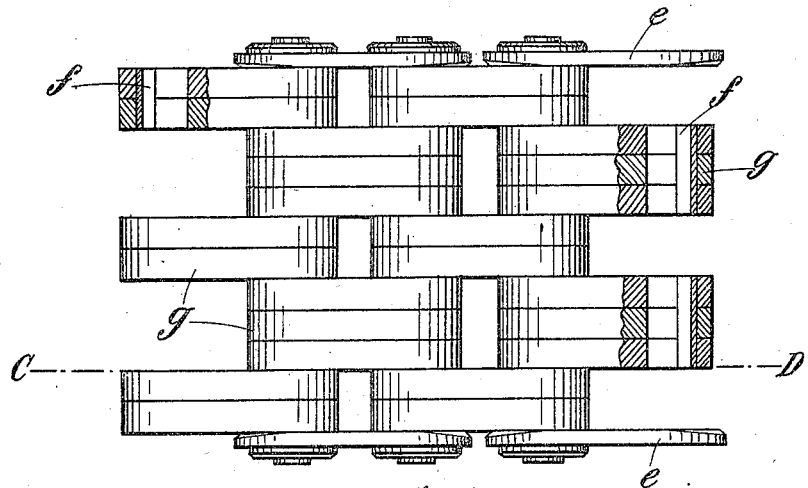
Fig. 4.
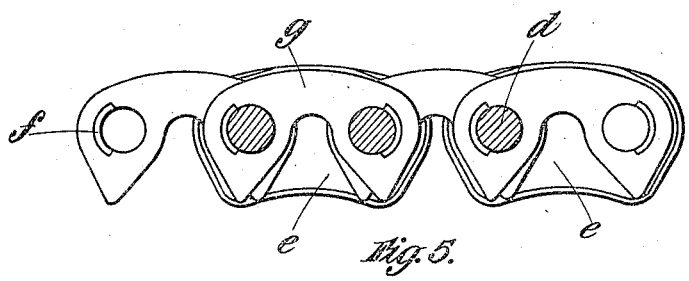
Fig. 5.
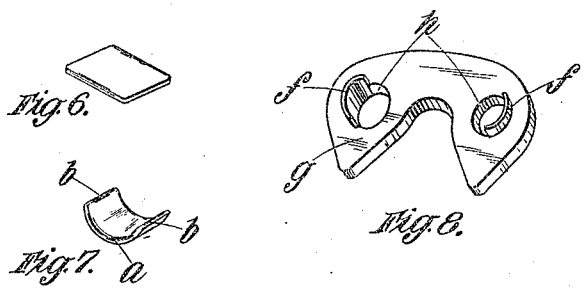
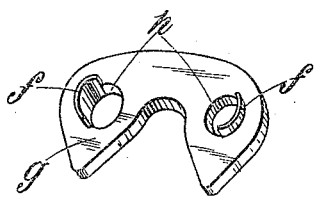
Fig. 6.
Fig. 7.
Fig. 8.
HANS RENOLD
ADRIAN ETHELBERT CARTER, INVENTORS
by
Attorney

UNITED STATES PATENT OFFICE.

HANS RENOLD AND ADRIAN ETHELBERT CARTER, OF MANCHESTER, ENGLAND, ASSIGNORS TO HANS RENOLD LIMITED, OF MANCHESTER, ENGLAND.

DRIVING-CHAIN.

1,306,078. Specification of Letters Patent. Patented June 10, 1919.

Application filed August 17, 1917. Serial No. 186,752.

*To all whom it may concern:*

Be it known that we, HANS RENOLD and ADRIAN ETHELBERT CARTER, both subjects of the King of Great Britain, and residents of Burnage Works, Didsbury, Manchester, in the county of Lancaster, England, have invented certain new and useful Improvements Relating to Driving-Chains, of which the following is a specification.

This invention relates to driving chains of the silent type. It is the object of the invention to improve the construction and the durability or effectiveness of such chains.

The invention is illustrated in the accompanying drawings, in which:—

Fig. 4 is a plan view with some of the links partly in section, and

Fig. 5 is a section on the line C—D of Fig. 4, showing a multiple block-unit chain with the links in pairs and triplets, fitted close together on the segmental bushes.

Figs. 6 and 7 are detail views illustrating the formation of the segmental bushes.

Fig. 8 is a perspective view showing a link with the segmental bushes fitted therein, and ready for another link to be applied to make up a double block unit.

Figure 1:
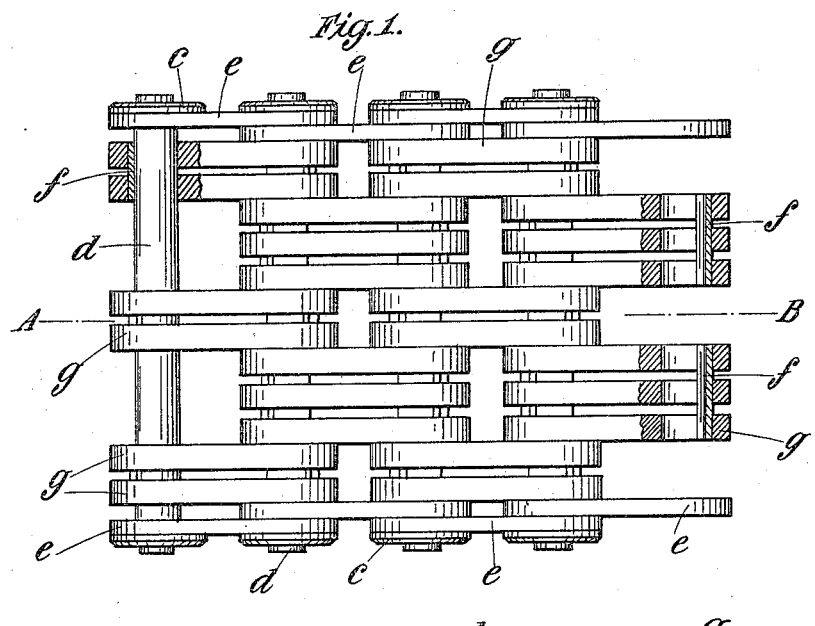
Figure 1 shows a plan view of part of a chain with some of the links partly in section.
Figure 2:
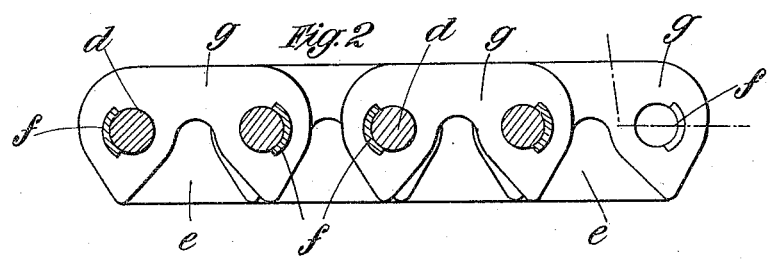
Fig. 2 shows a longitudinal section on the line A—B of Fig. 1, illustrating a chain with the links spaced apart on the bushes so as to leave clearance between links of the same block unit, which will provide ready access for the lubricant to the studs and bearing surfaces.

Referring first to Figs. 1 and 2, it will be seen that the silent chain links $g$ are of the usual arched form and their external dimensions are fixed by known considerations for a chain of any given pitch meshing with gear wheels having teeth of usual shape. The links are shown as being made up into block units, those in one pitch consisting each of a pair of links $g$ connected by a segmental bush $f$ at each end, while in the next pitch, in order to secure a balanced arrangement, each block unit consists of three links $g$ connected by a pair of segmental bushes $f$. This construction is only illustrated by way of example, and any other convenient arrangements of block units might be used, depending upon the width of the chain and the purpose it is intended to serve. Guide links, which may also serve as reinforcing links, are shown at $e$ at the ends of each pitch, the studs $d$ being riveted against washers $c$ outside said guide links.

It will be seen that the segmental bushes $f$ do not project or overlap at all, but are supported quite up to their ends in the solid metal of the links $g$ so that no bending of the bushes can possibly occur. The very short exposed sections of the segmental bushes, in the gaps between the links $g$ of each block unit when made up as in Fig. 1, are so well supported at either side that they take their full share of the bearing pressure in practice.

Figure 3:
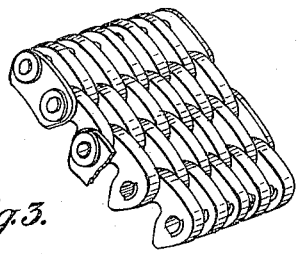
Fig. 3 is a perspective view, partly broken away, showing a chain with separate segmental bushes in each link.

Fig. 3 shows a multiple strand silent chain with separate links arranged in alternate positions as is commonly done in chains with circular bushes, but instead of these circular bushes the links $g$ in this case have segmental bushes $f$, which are separate for each link and do not project or overlap at all. The result is that the studs $d$ can be substantially larger in diameter than in a chain of corresponding pitch and strength having circular bushes, or having overlapping liners; and the bearing area on the studs is more effectively utilized. Separate segmental bushes in each link can be used only when the links are of good width as in Fig. 3.

In the chain shown in Figs. 4 and 5, the links are again arranged in block units, just as in Figs. 1 and 2, but the links $g$ of each block unit are placed close together on the segmental bushes $f$, and guide links $e$ are only used in alternate pitches at the sides of the chain. It will be noted in this case again how comparatively large the studs $d$ can be, and what a wide angle of embrace the segmental bushes $f$ can be made to have.

In manufacturing chains according to the present invention we preferably proceed as follows: The links $g$ are punched out or otherwise formed and finished externally in the usual manner to the correct shape for a chain of the silent type. The stud holes are cut out in one or more—generally several—operations, to form holes which may be of very slightly larger diameter than the outside diameter of the studs $d$ to be used, and either during the same operations or in subsequent ones, a segmental gap or aperture of larger radius is slotted out from the metal of the link at each stud hole to receive the segmental bushes $f$ as in Figs. 2 and 5. These bushes are preferably formed by rolling out a wide strip or sheet of steel to precisely the correct thickness or gage, slitting it into narrow strips slightly wider than the widths of the required segmental bushes, punching out the blanks for the segmental bushes from these strips by means of punches shaped so as to leave the blanks with rounded corners as shown in Fig. 6, and then bending up the blanks to the required segmental shape as in Fig. 7. This shape is such that the edges $a$ are rounded, and also preferably the edges $b$ as indicated are slightly rounded. The segmental bushes when shaped, are hardened, and then fitted into slots in the chain links. The slots are made slightly smaller than the segmental bushes so as to insure a true force fit. The longitudinal edges $b$ of the segmental bushes are radial or nearly so, and they therefore interlock with or dovetail into the ends of the slots in the links, making a tight fit which cannot afterward work loose. This is of great importance, as if the bushes could work loose in running they would be ineffective. In fitting the segmental bushes into the links of a double block unit, they are preferably first forced into one of the links as shown in Fig. 8, and then the projecting halves of the bushes are forced into the other link, so that each part is only forced into the one link in which it is to remain, and not through one link into another. In making up a treble block unit, one end of each bush must be forced through the middle link of the block unit and into the outer link at one side, but there is no risk of the bushes working loose in the link slots in that case, particularly when the middle links are clamped tightly between the outer links as in the treble block units of Figs. 4 and 5.

When the segmental bushes $f$ have been inserted, we find it desirable to grind or glaze off the faces flush at the stud holes, so as to leave no trace of a lateral projection where the segmental bushes are inserted; if this were not done, as the bushes embrace the studs over a wide angle, the edges might catch one against another as the chain is flexed and so spoil the chain.

By the method of forming and fitting the segmental bushes $f$ as above explained, they are made absolutely true both in thickness and in curvature, so that the chain is of correct pitch in every link, and there is substantially no subsequent extension of pitch due to bedding down as the chain works, because the bearing surfaces are all correct in form and position at the start, and they remain so while taking their fair share of the load and wear. It is to be noted also that, as the bushes are made and inserted accurately true to pitch, and as the tooth faces of the links are generally ground to their final shape while supported by a pin corresponding with a stud engaging in one of the stud holes, the tooth faces of the links will also be true to pitch; hence, in the running of the chain, the tooth faces of the links all take from the start their fair share of the load from the wheel teeth, so that the wear is always evenly distributed and the effective life of the chain is increased.

However the chains are made up, whether with single links or block units, they are always easy to assemble, or to take apart and connect again, whenever replacement of a link is needed for example. The stud holes in the parts $h$, Fig. 8, not occupied by the liners, are preferably made a shade larger than the studs which are to pass therethrough, so that the studs $d$ will normally touch only against the segmental bushes $f$. A slight clearance at $h$ in the stud holes is also of advantage in enabling oil to enter so as to keep the bearing surfaces effectively lubricated. The rounded edges of the bushes at $a$ and $b$, Fig. 7, prevent scoring of the studs, and also facilitate the leading in of oil between the bushes and the studs when the chain is running. The segmental bushes can be made practically glass hard, as they are short and there is no risk of distortion or fracture in inserting them once into the link slots.

Throughout this specification and the claims which follow, the term "block unit" means a separate block or element for a chain, consisting of two or more gear links permanently and inseparably united by a pair of bushes, such block unit being adapted to be mounted directly on the studs of a chain in staggered relation to other block units in adjacent pitches of the chain. Such block units are essentially separable from other block units of the same chain merely by removing the studs on which they are mounted, and without removing from the links the bushes which are an integral part of each unit.

Having thus described our invention what we claim as new and desire to secure by Letters Patent is:—

1. A multiple strand driving chain comprising a plurality of separate block units in each pitch thereof, in laterally staggered relation to block units in adjacent pitches, studs connecting the block units of one pitch to those of another, and means for holding the studs in position, each separate block unit including a plurality of gear link plates with stud holes therein slotted at the sides thereof nearest the ends of the links to receive segmental bushes, and a pair of segmental bushes having a force fit in such slots in the outer sides of the stud holes, said segmental bushes terminating flush with the outer side faces of the lateral link plates of the block units.

2. A block unit for driving chains, said block unit being adapted to be mounted directly on the studs of a driving chain as an independent link unit, and comprising a plurality of link plates each formed with gear teeth and with stud holes having slots of segmental shape at their outer sides, and a pair of segmental bushes connecting said link plates together at the slots of said stud holes, said segmental bushes having a force fit in the said slots, and terminating flush with the outer faces of the lateral link plates of the block unit, whereby all projecting surfaces at the sides of the link unit are avoided, and the segmental bushes are supported up to their ends in the metal of the link plates.

3. A block unit for driving chains, said block unit being adapted to be mounted directly on the studs of a driving chain as an independent link unit, and comprising a plurality of link plates each formed with gear teeth, with stud holes of a size around the inner sides thereof such as just to allow the chain studs to pass therethrough, and with segmental slots in the metal of the link plates at the outer sides of said stud holes, and a pair of segmental bushes having a force fit in said slots and serving to connect together the link plates of the unit, said segmental bushes terminating flush with the outer faces of the lateral link plates of the unit.

4. A multiple strand driving chain, comprising a plurality of separate block units in each pitch thereof, in laterally staggered relation to block units in adjacent pitches, studs connecting the block units of one pitch to those of the next pitch of the chain, and means for securing the studs in position, each separate block unit comprising a plurality of gear link plates with a pair of segmental bushes connecting them together, which bushes terminate flush with the outer faces of the lateral link plates of said unit, and therefore do not anywhere overlap the bushes of other block units of the chain engaging with the same stud.

HANS RENOLD.
ADRIAN ETHELBERT CARTER.

Copies of this patent may be obtained for five cents each, by addressing the "Commissioner of Patents, Washington, D. C."